United States Patent
Chen et al.

(10) Patent No.: US 8,077,996 B2
(45) Date of Patent: Dec. 13, 2011

(54) VIDEO PROCESSING METHOD AND APPARATUS BASED ON SMOOTH DETECTION

(75) Inventors: Bing-Jhe Chen, Miao-Li Hsien (TW); Po-Wei Chao, Hsin-Tien (TW)

(73) Assignee: Realtek Semiconductor Corp., Hsinchu (TW)

( * ) Notice: Subject to any disclaimer, the term of this patent is extended or adjusted under 35 U.S.C. 154(b) by 1264 days.

(21) Appl. No.: 11/740,931

(22) Filed: Apr. 27, 2007

(65) Prior Publication Data

US 2007/0262997 A1    Nov. 15, 2007

(30) Foreign Application Priority Data

May 9, 2006    (TW) .............................. 95116382 A

(51) Int. Cl.
*G06K 9/40* (2006.01)
(52) U.S. Cl. ...................................... 382/260; 382/264
(58) Field of Classification Search .................. 382/260, 382/254, 264, 266; 348/461, 463, 460
See application file for complete search history.

(56) References Cited

U.S. PATENT DOCUMENTS

| | | | |
|---|---|---|---|
| 5,260,782 A | 11/1993 | Hui | |
| 5,305,120 A | 4/1994 | Faroudja | |
| 5,473,384 A * | 12/1995 | Jayant et al. | 348/470 |
| 5,850,294 A * | 12/1998 | Apostolopoulos et al. | 358/426.14 |
| 6,611,608 B1 | 8/2003 | Wu | |
| 6,985,158 B2 * | 1/2006 | Miller et al. | 345/598 |
| 7,085,420 B2 * | 8/2006 | Mehrotra | 382/232 |

* cited by examiner

*Primary Examiner* — Yon Couso
(74) *Attorney, Agent, or Firm* — Thomas, Kayden, Horstemeyer & Risley, LLP

(57) ABSTRACT

The present invention discloses a video processing apparatus. The video processing apparatus includes a smooth detecting module and a video processing module. The smooth detecting module categorizes a target position in a target image of a video data as a smooth position or a non-smooth position to generate a categorizing result. The video processing module performs at least one of a plurality of video processing operations upon the target position according to the categorizing result.

22 Claims, 2 Drawing Sheets

VIDEO PROCESSING METHOD AND APPARATUS BASED ON SMOOTH DETECTION

BACKGROUND OF THE INVENTION

1. Field of the Invention

The present invention relates to a video processing method, and more particularly, to a video processing method and related apparatus for performing a smooth detection on video data, and for selectively performing different video processing operations according to a result generated by a smooth detection.

2. Description of the Prior Art

In the field of video processing, a result generated by a motion detection is usually used as a basis for determining whether to perform video processing operations in the spatial domain or in the temporal domain. For example, when performing deinterlacing or luminance/chrominace separating, the result of the motion detection is utilized to determine whether to perform the video processing operations in the spatial domain or in the temporal domain.

However, the result of the conventional motion detection may be not very reliable. Determining whether to perform video processing operations in the spatial domain or in the temporal domain according to the result of the motion detection may cause problems. For instance, video processing operations in the spatial domain are usually suitable for processing a motion position in a digital image. However, if the motion position is determined as a still position erroneously by the motion detection, the video processing operation in the temporal domain will be utilized for encoding/decoding the motion position instead of the video processing operation in the spatial domain, and which may result in a video artifact easily seen. An image quality of the processed image is therefore usually decreased due to this video artifact.

SUMMARY OF THE INVENTION

According to an embodiment of the claimed invention, a method for processing video data is disclosed. The method comprises: categorizing a target position in a target image of the video data as one of a smooth position and a non-smooth position to generate a categorizing result; and performing at least one of a plurality of video processing operations upon the target position according to the categorizing result; wherein the categorizing step utilizes a smooth detection.

According to an embodiment of the claimed invention, a method for processing video data is further disclosed. The method comprises: performing a smooth detection to categorize a target position in a target image of the video data as one of a smooth position and a non-smooth position to generate a smooth-detection result; performing a motion detection to categorize the target position as one of a motion position and a still position to generate a motion-detection result; and performing at least one of a plurality of video processing operations upon the target position according to at least one of the smooth-detection result and the motion-detection result.

According to an embodiment of the claimed invention, a video processing apparatus is disclosed. The video processing apparatus comprises a smooth detecting module and a video processing module. The smooth detecting module is utilized for categorizing a target position in a target image in a video data as one of a smooth position and a non-smooth position to generate a categorizing result. The video processing module is coupled to the video processing module and utilized for performing at least one of a plurality of video processing operations upon the target position according to the categorizing result generated by the smooth detection.

According to an embodiment of the claimed invention, a video processing apparatus is further disclosed. The video processing apparatus comprises a smooth detecting module, a motion detecting module, and a video processing module. The smooth detecting module is utilized for categorizing a target position in a target image of the video data as one of a smooth position and a non-smooth position. The motion detecting module is utilized for categorizing the target position as one of a motion position and a still position. The video processing module is coupled to the smooth detecting module and the motion detecting module, and is utilized for performing at least one of a plurality of video processing operations upon the target position according to at least one of a categorizing result generated by the smooth detection module and a categorizing result generated by the motion detection module.

These and other objectives of the present invention will no doubt become obvious to those of ordinary skill in the art after reading the following detailed description of the preferred embodiment that is illustrated in the various figures and drawings.

DETAILED DESCRIPTION

In practice, an image area having an artifact (e.g. color spreading or bleeding) caused by video processing operation may result from the image area being adjacent to a color edge, or the image area being a grid image. Otherwise, a smooth image area does not often contain an artifact when utilizing the video processing operations in the spatial domain. Therefore, the present invention introduces a concept of smooth detection. The concept of smooth detection is applied in video processing as a basis for selecting video processing operations in the spatial domain or in the temporal domain. Utilizing smooth detection to avoid selecting an inappropriate video processing operation will therefore reduce the artifact.

Figure 1:
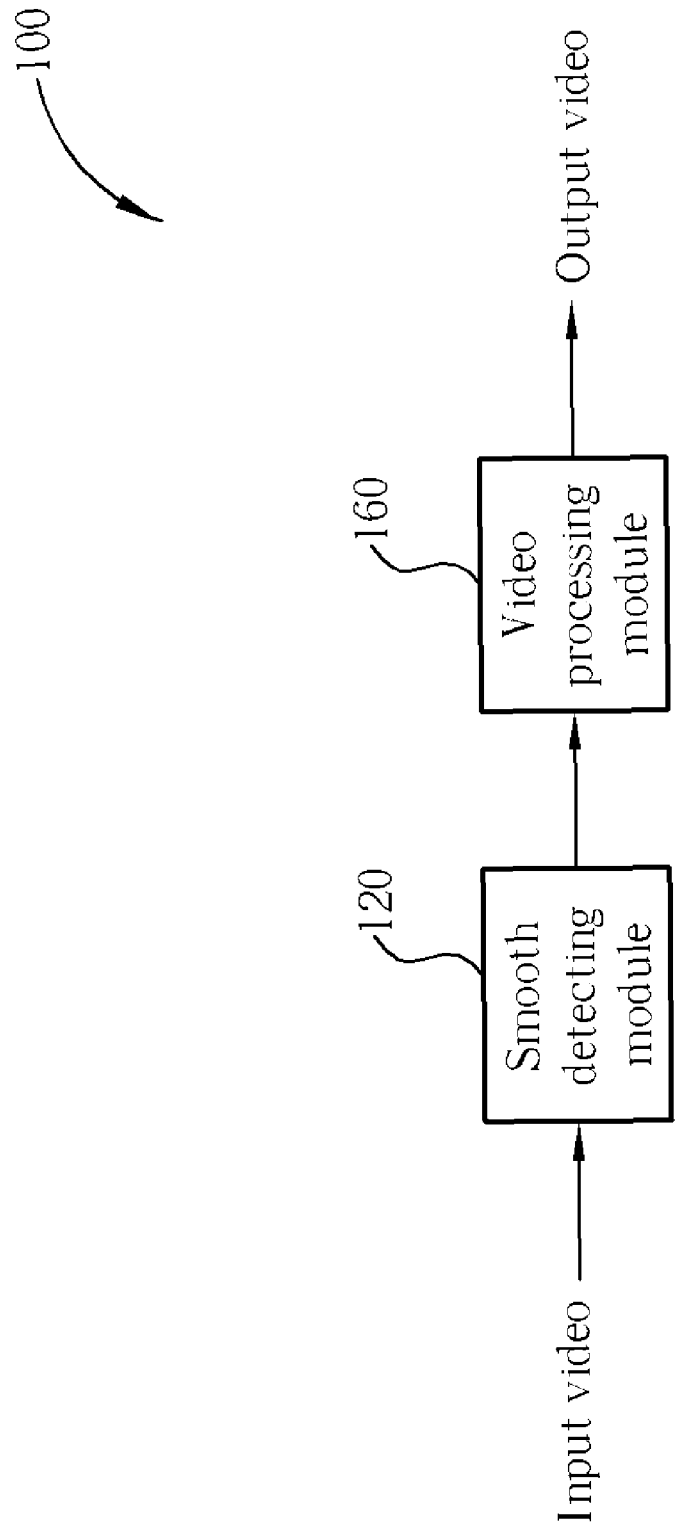
FIG. 1 is a diagram of a video processing apparatus according to an embodiment of the present invention.

Please refer to FIG. 1. FIG. 1 is a diagram of a video processing apparatus 100 according to an embodiment of the present invention. The video processing apparatus 100 comprises a smooth detecting module 120 and a video processing module 160. The smooth detecting module 120 is utilized for performing a smooth detection to categorize a target position in a target image of input video data as a smooth position or a non-smooth position. The video processing module 160 is utilized for selectively performing at least one of a plurality of video processing operations on the target position according to a result generated by categorizing the target position utilizing the smooth detection. The above-mentioned video processing operations include video processing operations in the spatial domain and video processing operations in the temporal domain.

Various existing schemes are capable of realizing the operation of the smooth detecting module 120. For example, one of the schemes utilizes an edge detection to detect edge information included in the target image to categorize the target position as a smooth position or a non-smooth position. However, the smooth detecting module 120 can also detect differences between pixel values of a plurality of pixels in a pixel window corresponding to the target position for categorizing the target position as a smooth position or a non-smooth position. By using the above-mentioned schemes, the smooth detecting module 120 can correctly categorize the target position as a smooth position or a non-smooth position by only detecting information (pixel values or edge information) included in a single image (i.e. the target image). It is not necessary for the smooth detecting module 120 to detect information in other images. The above-mentioned schemes are examples illustrating the operation of the smooth detection. The scope of the present invention is not limited to these implementations. In this embodiment, after the result generated by the smooth detecting module 120 has been received by the video processing module 160, the video processing module 160 performs a video processing operation in the spatial domain upon the target position if the target position is categorized as a smooth position. Otherwise, the video processing module 160 performs a video processing operation in the temporal domain upon the target position if the target position is categorized as a non-smooth position.

Figure 2:
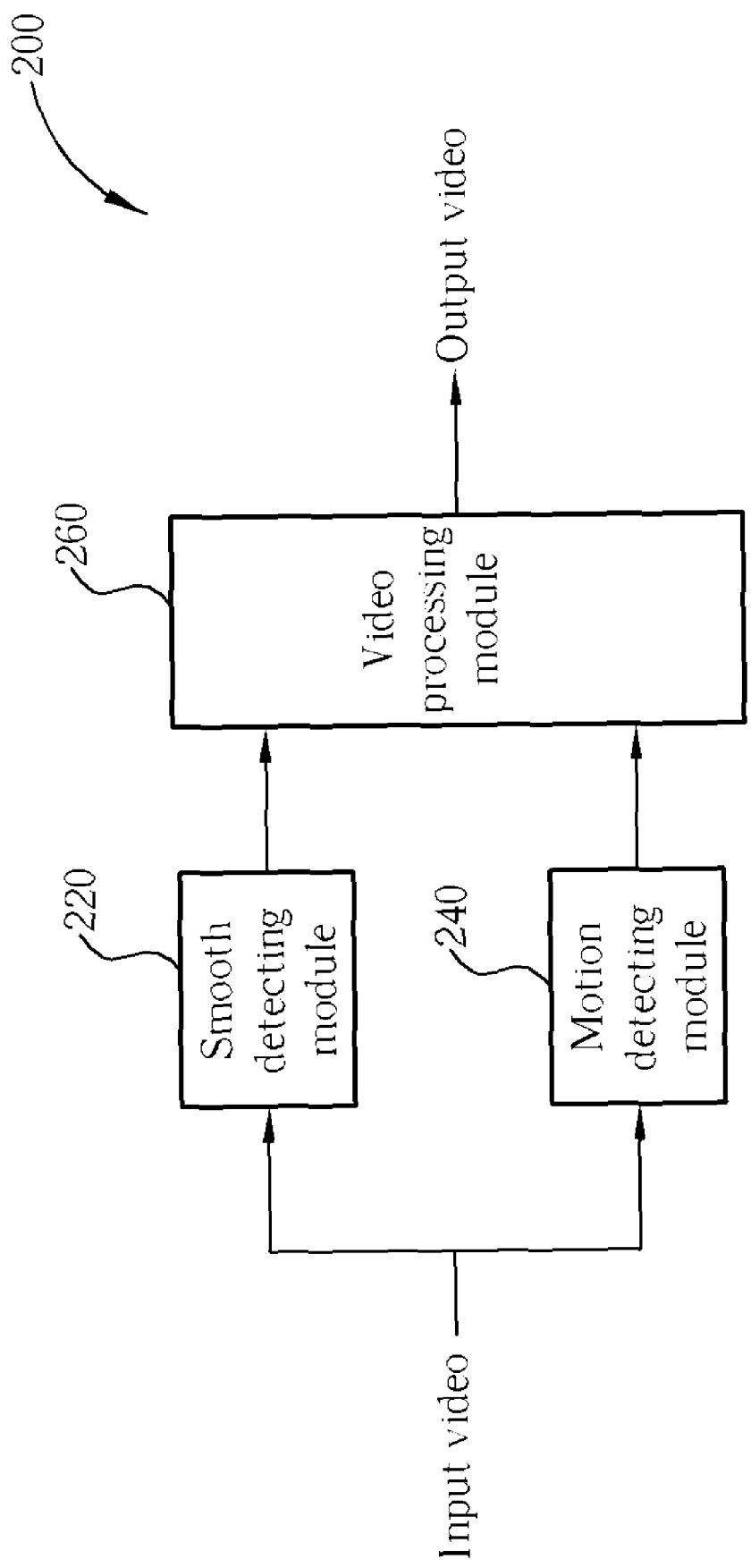
FIG. 2 is a diagram of a video processing apparatus according to another embodiment of the present invention.

Please refer to FIG. 2. FIG. 2 is a diagram of a video processing apparatus 200 according to another embodiment of the present invention. A smooth detecting module 220 operates in conjunction with a motion detecting module 240. As shown in FIG. 2, the video processing apparatus 200 includes the smooth detecting module 220, the motion detecting module 240, and a video processing module 260. The motion detecting module 240 is utilized for performing a motion detection to categorize a target position in a target image of input video data as a motion position or a still position. The operation of the smooth detecting module 220 is similar to that of the smooth detecting module 120, and the illustration of the smooth detecting module 220 is therefore not detailed for brevity. The video processing module 260 is utilized for selectively performing at least one of a plurality of video processing operations upon the target position according to a result generated by categorizing the target position with the smooth detecting module 220 and a result generated by categorizing the target position with the motion detecting module 240. Similarly, the above-mentioned video processing operations include video processing operations in the spatial domain and video processing operations in the temporal domain.

After receiving the results generated by the smooth detecting module 220 and the motion detecting module 240, the video processing module 260 performs a video processing operation in the spatial domain upon the target position if the target position is categorized as a smooth position, no matter the target position is categorized as a motion position or a still position by the motion detecting module 240. Otherwise, the video processing module 260 performs a video processing operation in the spatial domain upon the target position if the target position is categorized as a non-smooth position and a motion position. Additionally, if the target position is categorized as a non-smooth position and as a still position, the video processing module 260 performs a video processing operation in the temporal domain upon the target position. As mentioned above, the video processing module 260 performs a video processing operation in the temporal domain upon a target position only when the target position is categorized as a non-smooth position and a still position simultaneously. Therefore, a video artifact in output video data by erroneously utilizing the video processing operation in the temporal domain upon a target image can be avoided by the video processing apparatus 200.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method implemented in a video processing apparatus for processing video data, comprising:
    categorizing, at a smooth detecting module, a target position in a target image of the video data as one of a smooth position and a non-smooth position to generate a categorizing result; and
    performing, at a video processing module, at least one of a plurality of video processing operations upon the target position according to the categorizing result, wherein the plurality of video processing operations comprises a video processing operation in a spatial domain and a video processing operation in a temporal domain;
    wherein the categorizing step utilizes a smooth detection.

2. The method of claim 1, wherein the categorizing step comprises:
    detecting the target image for an edge information to categorize the target position.

3. The method of claim 1, wherein the categorizing step comprises:
    detecting differences between pixel values of a plurality of pixels in a pixel window to categorize the target position;
    wherein the pixel window corresponds to the target position.

4. The method of claim 1, wherein the step of performing at least one of the plurality of video processing operations comprises:
    performing a video processing operation in the spatial domain upon the target position if the target position is categorized as the smooth position.

5. The method of claim 1, wherein the step of performing at least one of the plurality of video processing operations comprises:
    performing a video processing operation in the temporal domain upon the target position if the target position is categorized as the non-smooth position.

6. A method implemented in a video processing apparatus for processing video data, comprising:
    performing, at a smooth detection module, a smooth detection to categorize a target position in a target image of the video data as one of a smooth position and a non-smooth position to generate a smooth-detection result;
    performing, at a motion detection module, a motion detection to categorize the target position as one of a motion position and a still position to generate a motion-detection result; and
    performing, at a video processing module, at least one of a plurality of video processing operations upon the target position according to at least one of the smooth-detection result and the motion-detection result, wherein the plurality of video processing operations comprises a video processing operation in a spatial domain and a video processing operation in a temporal domain.

7. The method of claim 6, wherein the step of performing the smooth detection to categorize the target position comprises:
    detecting the target image for an edge information to categorize the target position as one of the smooth position and the non-smooth position.

8. The method of claim 6, wherein the step of performing the smooth detection to categorize the target position comprises:
    detecting differences between pixel values of a plurality of pixels in a pixel window to categorize the target position;

wherein the pixel window corresponds to the target position.

9. The method of claim 6, wherein the step of performing at least one of the plurality of video processing operations comprises:
performing a video processing operation in the spatial domain upon the target position if the target position is categorized as the smooth position, wherein the target position is one of the motion position and the still position.

10. The method of claim 6, wherein the step of performing at least one of the plurality of video processing operations comprises:
performing a video processing operation in the spatial domain upon the target position if the target position is categorized as the non-smooth position and the motion position simultaneously.

11. The method of claim 6, wherein the step of performing at least one of the plurality of video processing operations comprises:
performing a video processing operation in the temporal domain upon the target position if the target position is categorized as the non-smooth position and the still position simultaneously.

12. A video processing apparatus, comprising:
a smooth detecting module, for categorizing a target position in a target image in a video data as one of a smooth position and a non-smooth position to generate a categorizing result; and
a video processing module, coupled to the video processing module, for performing at least one of a plurality of video processing operations upon the target position according to the categorizing result generated by the smooth detecting module, wherein the plurality of video processing operations comprises a video processing operation in a spatial domain and a video processing operation in a temporal domain, and wherein the smooth detecting module and the video processing module are embodied in tangible circuitry.

13. The video processing apparatus of claim 12, wherein the smooth detecting module detects the target image for an edge information to categorize the target position as one of the smooth position and the non-smooth position.

14. The video processing apparatus of claim 12, wherein the smooth detecting module detects differences between pixel values of a plurality of pixels in a pixel window to categorize the target position as one of the smooth position and the non-smooth position, wherein the pixel window corresponds to the target position.

15. The video processing apparatus of claim 12, wherein the video processing module performs a video processing operation in the spatial domain upon the target position if the target position is categorized as the smooth position.

16. The video processing apparatus of claim 12, wherein the video processing module performs a video processing operation in the spatial domain upon the target position if the target position is categorized as the non-smooth position.

17. A video processing apparatus, comprising:
a smooth detecting module, for categorizing a target position in a target image of the video data as one of a smooth position and a non-smooth position;
a motion detecting module, for categorizing the target position as one of a motion position and a still position; and
a video processing module, coupled to the smooth detecting module and the motion detecting module, for performing at least one of a plurality of video processing operations upon the target position according to at least one of a categorizing result generated by the smooth detection module and a categorizing result generated by the motion detection module, wherein the plurality of video processing operations comprises a video processing operation in a spatial domain and a video processing operation in a temporal domain, and wherein the smooth detecting module, the motion detecting module, and the video processing module are embodied in tangible circuitry.

18. The video processing apparatus of claim 17, wherein the smooth detecting module detects an edge information included in the target image to categorize the target position as one of the smooth position and the non-smooth position.

19. The video processing apparatus of claim 17, wherein the smooth detecting module detects differences between pixel values of a plurality of pixels in a pixel window to categorize the target position as one of the smooth position and the non-smooth position, wherein the pixel window corresponds to the target position.

20. The video processing apparatus of claim 17, wherein the video processing module performs a video processing operation in the spatial domain upon the target position if the target position is categorized as the smooth position, wherein the target position is categorized as one of the motion position and the still position.

21. The video processing apparatus of claim 17, wherein the video processing module performs a video processing operation in the spatial domain upon the target position if the target position is categorized as the non-smooth position and the motion position simultaneously.

22. The video processing apparatus of claim 17, wherein the video processing module performs a video processing operation in the temporal domain upon the target position if the target position is categorized as the non-smooth position and the still position simultaneously.

* * * * *